US011613369B2

(12) United States Patent
Van Bavel et al.

(10) Patent No.: US 11,613,369 B2
(45) Date of Patent: Mar. 28, 2023

(54) PARALLEL HYBRID ELECTRIC PROPULSION MOTOR AND ELECTRIC POWER MODULE

(71) Applicants: Luc Van Bavel, Quebec (CA); Michael Derman, Bend, OR (US)

(72) Inventors: Luc Van Bavel, Quebec (CA); Michael Derman, Bend, OR (US)

(*) Notice: Subject to any disclaimer, the term of this patent is extended or adjusted under 35 U.S.C. 154(b) by 7 days.

(21) Appl. No.: 17/151,539

(22) Filed: Jan. 18, 2021

(65) Prior Publication Data

US 2021/0221526 A1 Jul. 22, 2021

Related U.S. Application Data

(60) Provisional application No. 62/962,842, filed on Jan. 17, 2020.

(51) Int. Cl.
| | | |
|---|---|---|
| *B64D 27/02* | (2006.01) | |
| *B64D 27/24* | (2006.01) | |
| *B64D 27/26* | (2006.01) | |
| *F01D 15/10* | (2006.01) | |
| *B64U 50/19* | (2023.01) | |

(52) U.S. Cl.
CPC .......... *B64D 27/24* (2013.01); *B64D 27/02* (2013.01); *B60L 2200/10* (2013.01); *B60Y 2400/112* (2013.01); *B64D 27/26* (2013.01); *B64D 2027/026* (2013.01); *B64D 2221/00* (2013.01); *B64U 50/19* (2023.01); *F01D 15/10* (2013.01); *Y02T 50/60* (2013.01)

(58) Field of Classification Search
CPC ........ B64D 27/24; B64D 27/02; B64D 27/26; B64D 2027/026; B64D 2221/00; B60L 2200/10; B60Y 2400/112; B64C 2201/042; F01D 15/10; Y02T 50/60; Y02T 50/40; F05D 2220/76
See application file for complete search history.

(56) References Cited

U.S. PATENT DOCUMENTS

| | | | |
|---|---|---|---|
| 2019/0322379 A1* | 10/2019 | Mackin | F02C 7/057 |
| 2020/0017228 A1* | 1/2020 | Combs | B64D 31/02 |
| 2021/0031934 A1* | 2/2021 | Becker | B64C 1/16 |
| 2021/0070458 A1* | 3/2021 | Sanders | F01D 15/10 |
| 2021/0078702 A1* | 3/2021 | Ciet | B64D 27/24 |

* cited by examiner

*Primary Examiner* — Gerald L Sung
*Assistant Examiner* — Rene D Ford
(74) *Attorney, Agent, or Firm* — Phillip M. Wagner

(57) ABSTRACT

Some apparatus embodiments include an aircraft having a hybrid parallel electric propulsion system including two internal combustion engines and an electric propulsion system including two electric motors electrically connected to an electric power module. The electric power module is optionally configured for attachment to a bottom side of a fuselage. Each of the electric motors attaches to an aircraft wing outboard of the nearest internal combustion engine. The electric motors and internal combustion engines are operable independently of one another, providing for propulsion by the electric motors during flight and ground operations when the internal combustion engines may operate inefficiently. Some embodiments are implemented as a hybrid parallel electric propulsion retrofit package for adding an electric propulsion system to an aircraft previously equipped only with internal combustion engines.

9 Claims, 4 Drawing Sheets

PARALLEL HYBRID ELECTRIC PROPULSION MOTOR AND ELECTRIC POWER MODULE

CROSS REFERENCE TO RELATED APPLICATIONS

This application claims the benefit of U.S. Provisional Patent Application No. 62/962,842 filed Jan. 17, 2020 and incorporated herein by reference in its entirety.

FIELD OF THE INVENTION

The disclosed apparatus embodiments relate generally to equipment for propulsion of passenger aircraft and more particularly to an aircraft having an internal combustion engine and an electric motor, either one or both of which may be used for propulsion during ground and/or flight operations.

BACKGROUND

Aircraft operating with engines that consume hydrocarbon fuels are a significant source of air pollution. Energy-efficient aircraft with low emissions of chemical compounds contributing to air pollution and global warming are therefore highly desirable. Aircraft powered in flight by electric motors receiving voltage and current from electric storage batteries, sometimes referred to as "electric aircraft", are being explored as a remedy for undesirable emissions and high fuel costs. The increasing availability of electricity for charging aircraft batteries from low-emission energy technologies such as solar power and wind power is contributing to the rapidly developing interest in electric aircraft. Electric aircraft are being built and evaluated for applications such as pilot training in small two seat aircraft and for aircraft with capacity for many more than two people. However, battery technology is not yet commercially available with sufficient electrical energy storage capacity in terms of joules of energy stored per kilogram of energy storage media for propelling an aircraft exclusively with electric motors for cost-competitive regional transportation of freight and passengers at distances of about 200 nautical miles or more.

Hybrid-electric propulsion systems have been designed and tested with the objectives of reducing consumption of hydrocarbon-based aircraft fuel and reducing related emissions. A hybrid-electric propulsion system includes an internal combustion engine such as a turbine engine or piston engine configured to drive a propeller and an electric motor configured to drive either the same propeller as the internal combustion engine or a different propeller. An aircraft having a hybrid-electric propulsion system may be powered by one or more internal combustion engines and one or more electric motors.

The internal combustion component of the hybrid-electric propulsion system uses hydrocarbon-based aircraft fuel. Electric power supplied to the electric motor may be provided by batteries, photovoltaic cells, fuel cells, an electric generator driven by the internal combustion engine, or combinations of these technologies. Placing an internal combustion engine and an electric motor in the same nacelle and finding a safe and accessible location for electric storage batteries could require substantial modification of existing aircraft and could increase the expense and time for safety certification of new aircraft for commercial flight operations.

SUMMARY

Some examples of an apparatus embodiment include an aircraft having a fuselage; a wing attached to the fuselage; and an internal combustion engine attached to the wing. An electric motor is attached to the wing at a position outboard from the internal combustion engine. An electrical cable is electrically connected to the electric motor and to an electric power module attached to a bottom side of the fuselage. The electric power module includes a battery pack electrically connected to the electric cable and the electric motor.

For some apparatus embodiments, the internal combustion engine is a first internal combustion engine attached to a starboard side of the wing and the electric motor is a first electric motor attached to the starboard side of the wing, with the apparatus further comprising a second internal combustion engine attached to a port side of the wing; a second electrical motor attached to the port side of the wing outboard from the second internal combustion engine; and a second electrical cable electrically connecting the second electrical motor to the electric power module.

The first electrical motor is optionally attached to the wing at a wingtip. The second electrical motor is optionally attached to the wing at a wingtip opposite the first electrical motor.

The electric power module optionally further includes a firewall, with the battery pack attached to the firewall; and a battery fairing attached to the firewall, with the battery fairing positioned to cover the battery pack.

Some apparatus embodiments include a first electric motor, the first electric motor configured for attachment to an aircraft wing; a second electric motor, the second electric motor configured for attachment to the aircraft wing on a side of an aircraft fuselage opposite the first electric motor; and an electric power module configured for attachment to a bottom side of an aircraft fuselage. The electric power module includes a battery pack having many electrically-interconnected rechargeable electric storage batteries. The apparatus embodiment further includes a first electric cable electrically connecting the first electric motor to the battery pack; a second electric cable electrically connecting the second electric motor to the battery pack; and a battery fairing for covering the electric power module. In some embodiments, the electric power module further includes a firewall attached to the battery pack and the battery fairing.

An apparatus embodiment optionally includes a wing strut configured for attachment to an aircraft fuselage and an aircraft wing, with the first electrical cable passing through the wing strut, and a second wing strut with the second electrical cable passing through the second wing strut.

DESCRIPTION

Figure 1:
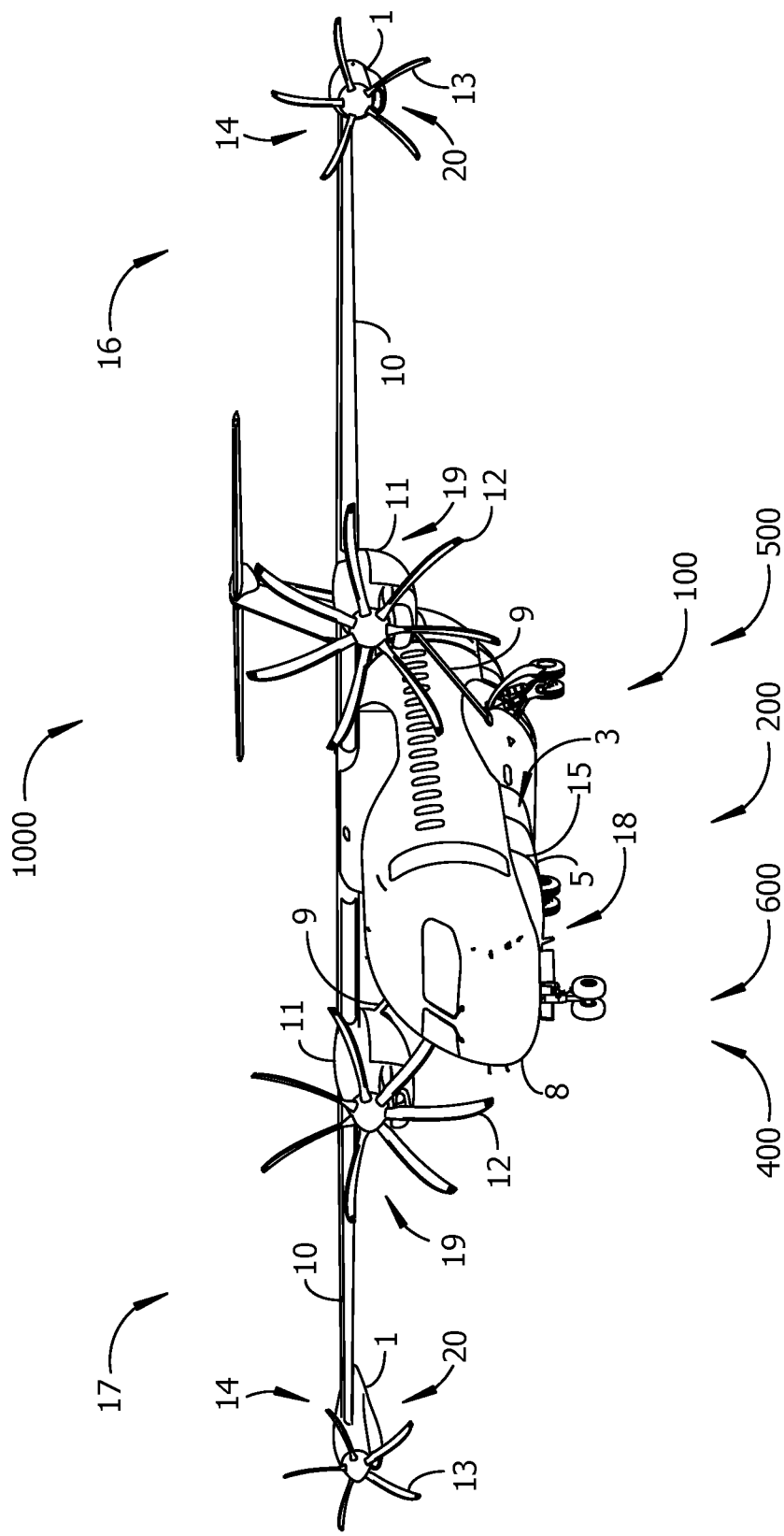
FIG. 1 is a pictorial view of an example embodiment of an aircraft equipped with two inboard internal combustion engines and a parallel hybrid electric motor propulsion system including two outboard electric motors drawing power from an electric power module on the bottom of the aircraft fuselage.

Apparatus embodiments include an electric propulsion system configured for installation on an aircraft equipped with an internal combustion engine driving a propeller. The example electric propulsions system, referred to herein as a parallel hybrid electric propulsion system, may be assembled into an aircraft when the aircraft is first manufactured. Embodiments of the electric propulsion system may alternately be provided as a hybrid parallel electric propulsion retrofit package for installation on previously built aircraft equipped with one or more internal combustion engines but no previously-installed electric motors suitable for providing power to propellers used for aircraft propulsion during flight operations and ground operations.

Embodiments of the electric propulsion system included in a parallel electric hybrid propulsion system include at least two electric motors, each electric motor coupled to a separate propeller, a battery pack including electric storage batteries whose individual capacities are combined to provide power to the electric motors, electric power cables establishing electrical connections between the electric motors and battery pack, and at least two internal combustion engines. The electric propulsion system may selectively be controlled independently of the internal combustion engines. An aircraft equipped with internal combustion engines and the parallel hybrid electric propulsion system may taxi, takeoff, travel in level flight, and land with only the internal combustion engines, with only the electric propulsion motors, and with the electric motors and internal combustion engines providing power together. The power contributed by the electric propulsion system is selectively variable from zero percent of the total available thrust of the parallel hybrid electric propulsion system, i.e., all thrust for taxiing or powered flight is from the internal combustion engines and none from the electric propulsion system, to 100 percent of the combined thrust, i.e., all thrust for taxiing or powered flight is from the electric propulsion system and none from the internal combustion engines.

The electric motors and batteries included in a parallel hybrid electric propulsion system provides a redundant source of power for takeoff, flight and landing should the internal combustion engines experience mechanical or electrical problems or run out of fuel. Use of the parallel hybrid electric propulsion system as a safety backup to the internal combustion engines can be enhanced by in-flight recharging of the battery pack from a generator powered by an internal combustion engine, a fuel cell, a ram air turbine, photovoltaic cells, or other means for generating electrical power during flight.

Airworthiness certification of an aircraft equipped with a parallel hybrid electric propulsion system is expected to be substantially faster and less costly than certification of an aircraft equipped only with electric motors for propulsion or an aircraft having an internal combustion engine and an electric motor connected in series or in parallel within the same nacelle or fairing. When retrofitted to a previously-built aircraft, a parallel hybrid electric propulsion system in accord with the disclosed embodiments may be added to the aircraft without significant modification to already-installed and operational internal combustion engines and fuel management systems. Furthermore, unlike requirements for fuel reserves for internal combustion engines, there are at present no certification or flight safety requirements for electric energy reserves for an aircraft equipped with a parallel hybrid electric propulsion system since safe flight is possible even with depleted batteries.

Example embodiments of parallel hybrid electric propulsion system may be developed and certified for installation on a baseline aircraft design having a propulsion system using one or more internal combustion engines. Alternatively, certification of the electric propulsion system can be made at a later stage, and installed as a retrofit package on aircraft already delivered, or may alternatively be installed on new aircraft at the time of aircraft manufacture. As used herein, a baseline aircraft refers to an aircraft configured for operation with one or more internal combustion engines but not including an electric propulsion system.

When an electric propulsion system in accord with the hybrid electric propulsion system is added to a baseline aircraft already equipped with internal combustion engines, the propulsion system using internal combustion engines may remain unchanged. Eliminating modification of the existing internal combustion engine and related fuel delivery and control systems reduces the levels of reliability and redundancy required for certification of an electric propulsion system added to the aircraft, in turn reducing weight and cost, since the aircraft remains operational in case of complete failure of the electric propulsion system. An electric propulsion system configured for operation with an aircraft equipped with internal combustion engines may be referred to as a parallel hybrid electric propulsion system and may alternately be referred to as a federated propulsion system. Some embodiments of a parallel hybrid electric propulsion system are designed to be compatible for installation within the weight and space limitations of existing (baseline) aircraft.

Operational experience gained with the parallel hybrid electric propulsion system will facilitate its subsequent certification as a flight critical system. A parallel hybrid electric propulsion system therefore enables a step by step, safe, and technically and economically predictable progression as battery energy density improves, from previously available internal combustion engine propulsion system to parallel hybrid electric propulsion system and possibly to all electric propulsion, using the same airframe. Embodiments of the parallel hybrid electric propulsion system are effective for use with internal combustion engines including, but not limited to, turbine engines and piston engines.

Electric storage batteries for powering the electric motors may be placed inside one or more conformal enclosures attached under the fuselage. A conformal enclosure, also referred to herein as an electric power module, optionally includes a firewall providing thermal and mechanical isolation of components in the electric power module from the fuselage in case of thermal runaway of a battery, a battery pack including a number of electrically interconnected electric storage batteries selected to provide the voltage, current, and storage capacity needed for a desired flight duration, and a battery fairing to cover and protect the batteries and provide streamlined airflow over the electric power module. Locating the batteries in one or more conformal enclosures facilitates access to batteries and related equipment for maintenance, recharging and battery exchange. For electric storage batteries having a sufficiently small risk of thermal runaway, batteries may optionally be located inside a wing or engine nacelle. For many short-range regional aircraft in current use, fuel tanks for the internal combustion engines only partially fill the internal wing volume, leaving space potentially available for the addition of electric storage batteries.

Electric motors and propellers included in a parallel hybrid electric propulsion system may be placed at or near the wingtips. The wingtip location provides excellent propulsive efficiency when the propeller rotation is oriented opposite to the wingtip vortex, thus counterclockwise propeller rotation on the left wingtip and clockwise rotation on the right wingtip. The wingtip location may also contribute to aircraft lateral control by differential thrust when electric motor controls are interconnected with the flight control system. The electric motors and propellers may alternatively be placed elsewhere along the wingspan. There may optionally be more than one electric motor per side of an aircraft.

The parallel hybrid electric propulsion system may be operated with the objective of reducing fuel consumption and emissions produced by the internal combustion engines. Reduced fuel consumption and emissions may be achieved by prioritizing electric propulsion where the internal combustion engines are less efficient. For example, ground operations, e.g. taxi from gate pushback to runway, can be conducted exclusively with electric propulsion while the internal combustion engines are operated only for the time required to warm up the engines prior to takeoff, about three minutes for example for some turbine engines. For regional aircraft on relatively short routes operating from congested airports, more than 10% of total fuel consumption on a given route may be spent for taxi between the gate and the runway.

The parallel hybrid electric propulsion system may selectively be operated at full power during climb in order to reduce the time to climb to cruise altitude. A turbine engine, for example, may be more fuel-efficient at cruise altitude than during low-altitude flight and climbing flight. Since the aircraft spends less time at low altitudes, using the parallel hybrid electric propulsion system during low altitude operation can save a substantial amount of fuel.

For presently available battery technology, batteries may preferably be recharged from ground facilities prior to each flight. The elimination of in-flight electric power generation and bleed air extraction for battery charging from an internal combustion engine such as a turbine engine results in measurable fuel savings on the order of 3%.

The electric propulsion system may optionally not be used during level cruise, where a turbine engine operates with its best fuel efficiency. However, with proper flight planning, any excess energy available from the batteries for a given route may be used during the cruise segment to reduce the duration of the flight, reduce the internal combustion engine power required to sustain normal cruise speed, and/or further reduce fuel consumption. The battery energy used during the cruise segment will preferably be calculated to allow for sufficient energy to remain in the batteries for the taxi segment after landing, thereby yielding even greater fuel savings.

During descent from cruise altitude, the internal combustion engines may be shut off when the parallel hybrid electric propulsion system is operating and has sufficient electric power remaining for powered descent and landing. An internal combustion engine may optionally be augmented or supplanted by an electric motor powered either by a turboshaft with an electric generator or by the batteries. Augmentation of an internal combustion engine in this manner will be enhanced with improvements in the ratio of stored energy to weight for electric batteries.

Wingtip propellers on electric motors may increase the lateral stability of the aircraft in case of internal combustion engine failure when the wingtip power is modulated accordingly, such as reducing power to the wingtip opposite to the failed internal combustion engine. This may be accomplished by establishing a control logic between the crew throttle setting, rudder pedal position and wingtip motor power level. Improved lateral control in case of engine failure allows the reduction of minimum control speeds, possibly reducing a takeoff distance.

Turning now to the examples of FIGS. 1-4, FIG. 1 shows an example aircraft embodiment 1000 equipped with an example embodiment of a hybrid electric propulsion system 100. The example hybrid electric propulsion system 100 includes an electric propulsion system 200 and internal combustion engines 11. The internal combustion engines 11 are positioned at an inboard position 19 on each wing 10. The example electric propulsion system 200 includes at least one electric motor 1 configured for attachment to the wing 10 on the port side 16. The example electric motor 1 is preferably attached to the wing at an outboard position 20 from the internal combustion engine 11 closest to the wingtip 14 on the port side. More than one electric motor 1 may optionally be installed on each wing. The example electric propulsion system 200 further includes at least one electric motor 1 configured for attachment to the wing 10 on the starboard side 17. The electric motor 1 on the starboard side 17 is preferably attached to the wing at an outboard position 20 from the internal combustion engine closest to the wingtip 14 on the starboard side. An electric motor 1 may optionally be installed at a location other than a wingtip, for example a position closer to the internal combustion engines 11 or a position between an internal combustion engine and the fuselage. Although the illustrated aircraft examples have two wings, a port wing 24 and a starboard wing 25, apparatus embodiments 100 are suitable for installation on aircraft having one wing.

Each of the electric propulsion motors 1 is preferably configured for independent operation from other electric motors and internal combustion engines 11 to drive propellers 13 for propulsion of the aircraft during flight and/or taxi. The electric motors may be operated without the internal combustion engines providing propulsive power to their respective propellers 12, the internal combustion engines may be operated without the electric motors providing propulsive power, and the electric motors and internal combustion engines may be operated together to combine their propulsive power to all propellers (12, 13).

FIG. 1 represents an example of a new aircraft 600 assembled with an embodiment of a parallel hybrid electric propulsion system 100. FIG. 1 further represents an example of a modified aircraft 500, corresponding to the example aircraft 300 of FIG. 4 after modification by installation of the hybrid electric propulsion system 100 using the example hybrid parallel electric propulsion retrofit package 400 of FIG. 2.

Figure 2:
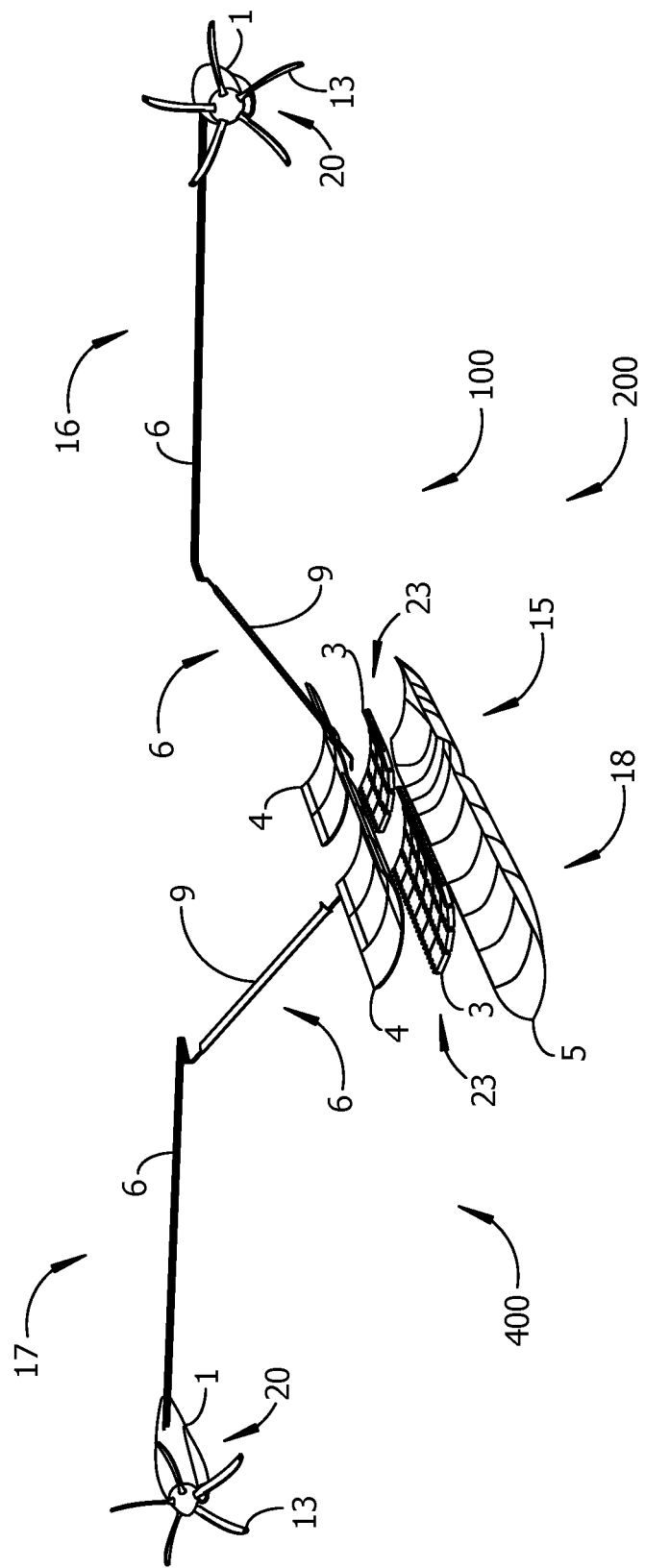
FIG. 2 is a schematic diagram of some components of the example parallel hybrid electric propulsion system included with the example aircraft embodiment of FIG. 1.

FIG. 2 shows a schematic representation of an example of an electric propulsion system 200 included in embodiments of the parallel hybrid electric propulsion system 100. The example embodiment of an electric propulsion system 200 includes a propeller 13 driven by an electric motor 1 to be positioned at an outboard location 20 on the starboard side 17, another propeller 13 and electric motor 1 to be positioned at an outboard location 20 on the port side 16, and an electric power module 15 to be positioned on a bottom side 18 of an aircraft fuselage. The electric power module 15 includes a battery pack 3, a firewall 4 configured to protect the fuselage 8 of an aircraft 1000 in case of battery thermal runaway, and a battery fairing 5. The battery pack 3 includes many electrically-interconnected rechargeable electric storage batteries 23. Electric cables 6 electrically connect the batteries 3 to the electric motors. Some embodiments of an electric propulsion system 200 include more than one battery pack as suggested in the example of FIG. 2. Some embodiments of an electric propulsion system 200 include more than one electric power module 15.

The electric power cables 6 may optionally be routed through wing struts 9 and/or through the wing(s) 10. In some example embodiments 100, the electric power module 15 is configured for attachment to the bottom 18 of the fuselage 8. The electric power module 15 may optionally be configured for fast and safe replacement as an integral unit, for example by removing an electric power module with discharged batteries from an aircraft and installing an electric power module with fully charged batteries. The electric power module 15 may be attached to the bottom side 18 of an aircraft fuselage by screws, captive bolts, quarter-turn fasteners, or other secure and easily removable fasteners approved for aircraft use.

The figures show examples of a battery pack 3 positioned in the electric power module 15. Electric storage batteries 3 may alternatively be located inside the fuselage 8, inside the wing 10, or at locations on the exterior of the fuselage other than the example location shown in FIGS. 1-2, or in addition to the location example of FIGS. 1-2. Batteries providing power to each electric motor 1 may be grouped together at one location or may be located at more than one position on the wing and/or fuselage. Electric power cables 6 for interconnecting the batteries and electric motors may optionally be routed through the wing, through the fuselage, through a strut 9, through a conduit on the outer surface of the fuselage and/or wing, or in a combination of two or more of these example locations. The placement of batteries under the fuselage improves access for replacement to enable rapid battery exchange between flights, and may reduce the length, and therefore the weight, of an internal charging cable weight when an aircraft is equipped for fast charging through a ground accessible charge port.

Figure 3:
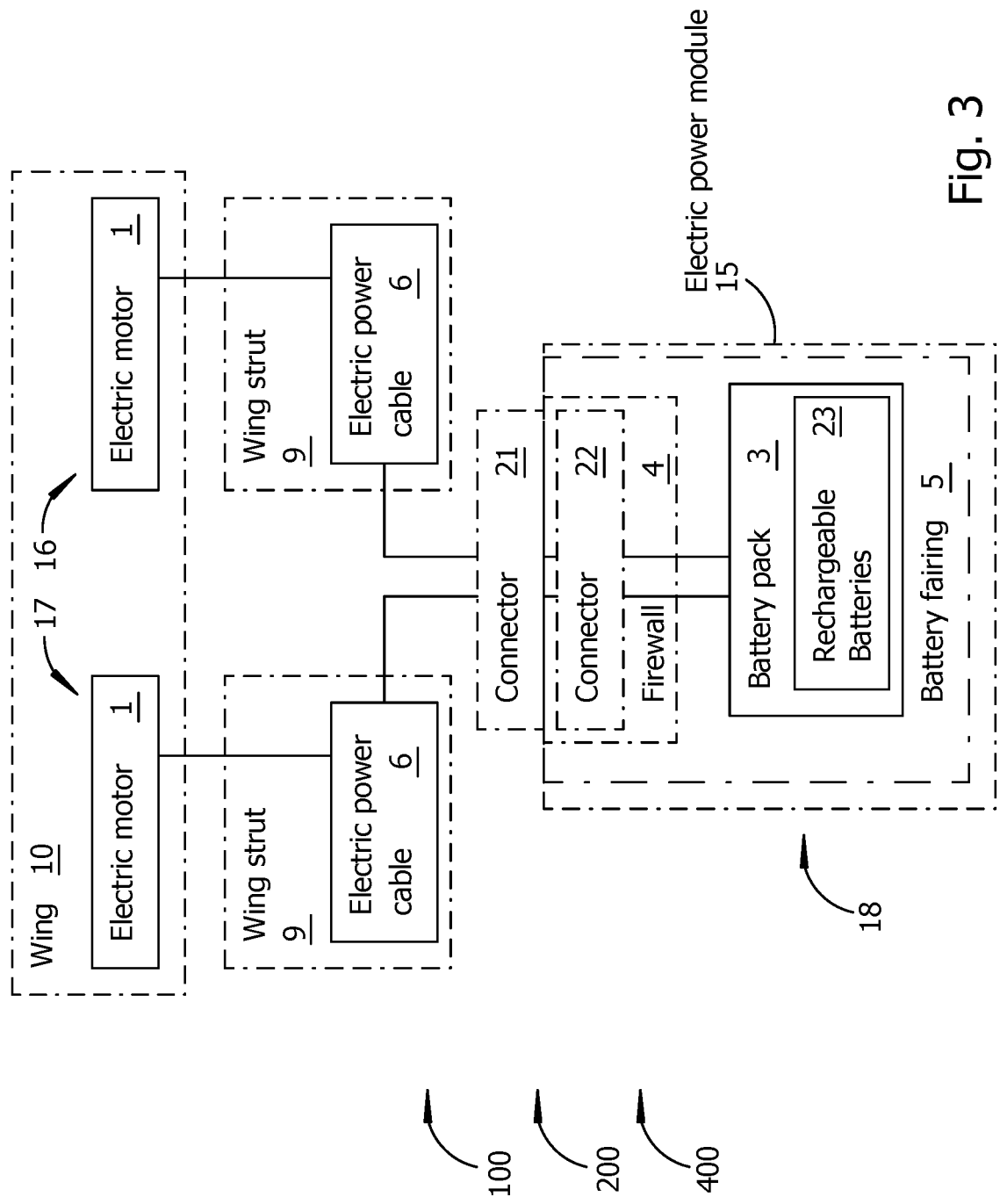
FIG. 3 is a block diagram showing examples of electrical connections between components of the parallel hybrid electric propulsion system of the previous figures.

FIG. 3 is a block diagram describing example locations and electrical connections between components included with an electric propulsion system 200 in the parallel hybrid electric propulsion system 100. A first electric motor 1 and a second electric motor 1 are configured for attachment to an aircraft wing 10. Electric power cables 6 electrically connect each electric motor 1 to the battery pack 3 in the electric power module 15. Electrical power cables 6 are optionally routed through wing struts 9 coupled to the wing 10 and fuselage. The electric power module 15, preferably configured for attachment to the bottom side 18 of an aircraft fuselage, is mechanically connected to the firewall 4 located on a bottom side 18 of the fuselage. In some aircraft embodiments 1000, the firewall is part of the electric power module. Alternately, the firewall is part of the aircraft. A first electrical connector 21 and a second electrical connector 22 configured for electrical and mechanical connection to the first electrical connector 21 provide a separable electrical connection between the electric power module and the aircraft.

Figure 4:
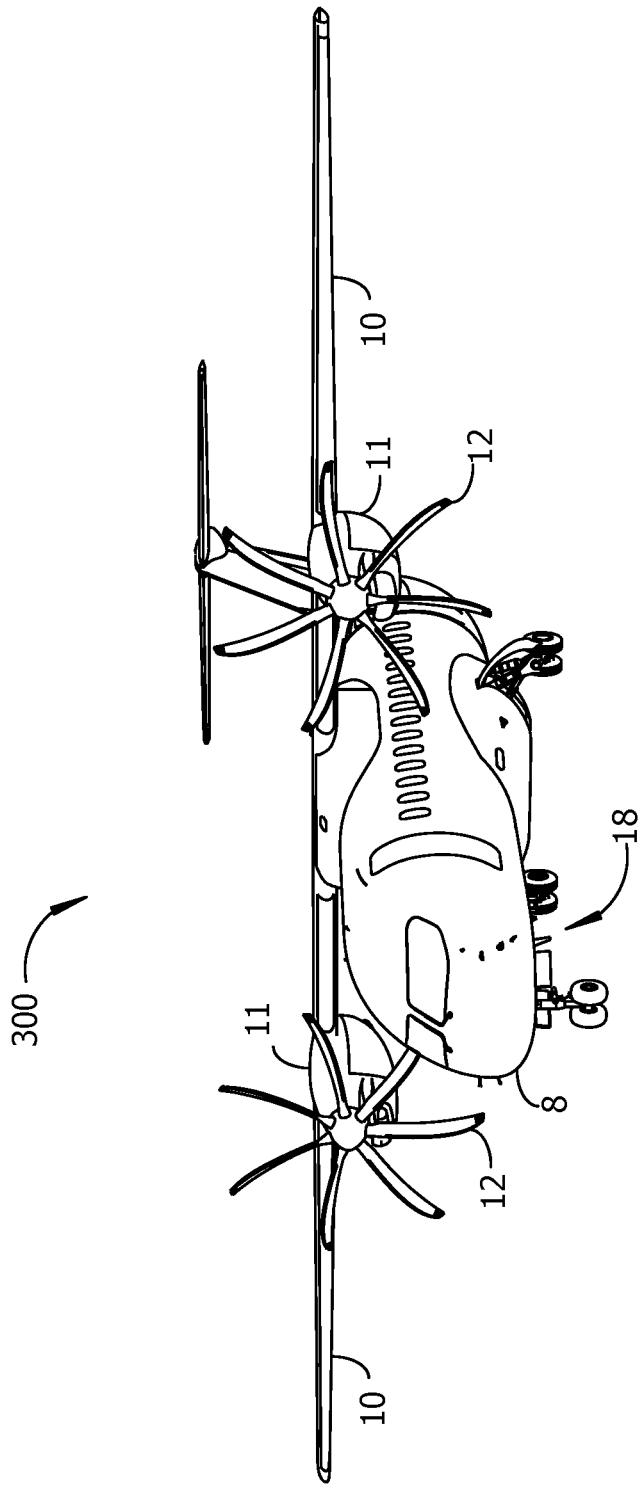
FIG. 4 is a pictorial view of an example of a prior art aircraft equipped with internal combustion engines but not equipped with a parallel hybrid electric propulsion system in accord with the disclosed embodiments.

FIG. 4 shows an example of a baseline aircraft 300 with an internal combustion engine propulsion system including an example of an internal combustion engine 11 on an aircraft wing 10, the internal combustion engine 11 configured for driving a propeller 12 for propulsion of the aircraft during flight and/or taxi. FIG. 4 represents an example of prior art showing an aircraft 300 not yet equipped with an embodiment of a parallel hybrid electric propulsion system.

The example electric propulsion system 200 of FIG. 2 may optionally be provided as a hybrid parallel electric propulsion retrofit package 400 for installation on a baseline aircraft 300 to create a hybrid electric propulsion system 100 in accord with the disclosed embodiments. An example retrofit package 400 includes an electric power module 15, electric power cables 6, and two electric motors 1. The retrofit package optionally includes propellers 13 for the electric motors. Some embodiments of the retrofit package 400 include two struts 9. The wing struts 9 may be used to carry structural loads in order to alleviate the wing bending moment contributed by the weight of the batteries in the electric power module 15 and optional batteries at other locations. The strut 9 may optionally be used to route the electric cables 6 away from the pressurized cabin, and away from wing fuel tanks, thereby reducing a potential fire hazard in the event of a spark or overheated wire from a damaged electrical cable 6.

Unless expressly stated otherwise herein, ordinary terms have their corresponding ordinary meanings within the respective contexts of their presentations, and ordinary terms of art have their corresponding regular meanings.

What is claimed is:

1. An aircraft, comprising:
   a fuselage;
   a wing attached to said fuselage;
   an internal combustion engine attached to said wing;
   an electric motor attached to said wing at a position outboard from said internal combustion engine;
   an electrical cable electrically connected to said electric motor;
   an electric power module attached to an external bottom side of said fuselage and electrically connected to said electrical cable, said electric power module comprising a battery pack electrically connected to said electrical cable, said electric power module including a firewall interposed between said electrical cable and said external bottom side of said fuselage, and said electrical cable electrically connected to said electric motor and said battery pack without passing inside said fuselage.

2. The aircraft of claim 1, wherein said internal combustion engine is a first internal combustion engine attached to a starboard side of said wing, said electric motor is a first electric motor attached to said starboard side of said wing, further comprising:
   a second internal combustion engine attached to a port side of said wing;
   a second electrical motor attached to said port side of said wing outboard from said second internal combustion engine; and
   a second electrical cable electrically connecting said second electrical motor to said electric power module.

3. The aircraft of claim 2, wherein said first electrical motor is attached to said wing at a wingtip.

4. The aircraft of claim 3, wherein said second electrical motor is attached to said wing at a wingtip opposite said first electrical motor.

5. The aircraft of claim 1, wherein said electric power module further comprises a battery fairing attached to said firewall, said battery fairing positioned to cover said battery pack.

6. A propulsion system for an aircraft, comprising:
   a first electric motor, said first electric motor configured for attachment to an aircraft wing;
   a second electric motor, said second electric motor configured for attachment to said aircraft wing;
   an electric power module configured for attachment to an external bottom side of an aircraft fuselage, said electric power module comprising a battery pack comprising a plurality of rechargeable electric storage batteries;
   a first electric cable electrically connecting said first electric motor to said battery pack;
   a second electric cable electrically connecting said second electric motor to said battery pack; and
   a battery fairing for covering said electric power module, wherein said first electric cable and said second electric cable are electrically connected to said battery pack without passing inside said aircraft fuselage.

7. The propulsion system for an aircraft of claim 6, said electric power module further comprising a firewall attached to said battery pack and said battery fairing, said firewall interposed between said external bottom side and said first and second electrical cables.

8. The propulsion system for an aircraft of claim 6, further comprising a wing strut configured for attachment to said aircraft fuselage and said aircraft wing, said first electrical cable passing through said wing strut.

9. The propulsion system for an aircraft of claim 8, further comprising a second wing strut configured for attachment to said aircraft fuselage and said aircraft wing, said second electrical cable passing through said second wing strut.

* * * * *